United States Patent
Cili et al.

(10) Patent No.: US 10,194,383 B2
(45) Date of Patent: Jan. 29, 2019

(54) APPARATUS, SYSTEM, AND METHOD FOR RADIO INTERFACE SELECTION FOR IMS CONNECTION BASED ON POWER CONSIDERATIONS

(71) Applicant: Apple Inc., Cupertino, CA (US)

(72) Inventors: Gencer Cili, Santa Clara, CA (US); Ajoy K. Singh, Milpitas, CA (US); Ahmet Ferhat Yildirim, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 172 days.

(21) Appl. No.: 15/013,932

(22) Filed: Feb. 2, 2016

(65) Prior Publication Data

US 2016/0316425 A1    Oct. 27, 2016

Related U.S. Application Data

(60) Provisional application No. 62/150,628, filed on Apr. 21, 2015.

(51) Int. Cl.
*H04W 48/18* (2009.01)
*H04W 24/08* (2009.01)
*H04W 52/02* (2009.01)

(52) U.S. Cl.
CPC ........... *H04W 48/18* (2013.01); *H04W 24/08* (2013.01); *H04W 52/0209* (2013.01); *Y02D 70/00* (2018.01); *Y02D 70/1224* (2018.01); *Y02D 70/1242* (2018.01); *Y02D 70/1262* (2018.01); *Y02D 70/1264* (2018.01); *Y02D 70/142* (2018.01); *Y02D 70/144* (2018.01);
(Continued)

(58) Field of Classification Search
CPC . H04W 24/08; H04W 48/18; H04W 52/0209; Y02B 60/50
See application file for complete search history.

(56) References Cited

U.S. PATENT DOCUMENTS

2007/0002857 A1*  1/2007  Maher ................. H04L 12/4633
                                          370/389
2008/0102815 A1    5/2008  Sengupta et al.
(Continued)

FOREIGN PATENT DOCUMENTS

| WO | 2012145706 A1 | 10/2012 |
| WO | 2013175267 A1 | 11/2013 |
| WO | 2015005602 A1 | 1/2015 |

OTHER PUBLICATIONS

International Search Report and Written Opinion for PCT/US2016/020656, dated May 13, 2016, 14 pages.
(Continued)

*Primary Examiner* — Awet Haile
(74) *Attorney, Agent, or Firm* — Meyertons Hood Kivlin Kowert & Goetzel, P.C.; Jeffrey C. Hood

(57) ABSTRACT

An apparatus, system, and method for selecting a connection for a real time application. In one embodiment, a mobile device may communicate with a cellular network over a cellular connection and a WLAN network over a WLAN connection. The mobile device may determine one or more network parameters of the cellular network or the WLAN network, which may affect power consumption of the mobile device. Based on the network parameter(s), the mobile device may select the WLAN connection for use in a real-time application of the mobile device.

20 Claims, 6 Drawing Sheets

(52) U.S. Cl.
CPC .......... *Y02D 70/146* (2018.01); *Y02D 70/164* (2018.01); *Y02D 70/168* (2018.01); *Y02D 70/23* (2018.01); *Y02D 70/24* (2018.01); *Y02D 70/26* (2018.01)

(56) References Cited

U.S. PATENT DOCUMENTS

| | | |
|---|---|---|
| 2009/0068969 A1 | 3/2009 | Lindoff et al. |
| 2011/0319072 A1* | 12/2011 | Ekici ............... H04W 48/18 455/426.1 |
| 2013/0295986 A1 | 11/2013 | Mueck |
| 2013/0329554 A1 | 12/2013 | Centoza et al. |
| 2013/0331091 A1* | 12/2013 | Chang ............. H04W 52/0229 455/423 |
| 2014/0274038 A1* | 9/2014 | Singhal ........... H04W 52/0209 455/434 |
| 2015/0003417 A1 | 1/2015 | Akiyoshi et al. |
| 2015/0312831 A1* | 10/2015 | Sang .............. H04W 36/0083 370/236 |
| 2016/0219589 A1* | 7/2016 | Khawer ........... H04W 72/0453 |

OTHER PUBLICATIONS

Sabbagh et al., "A Power Efficient RAT Selection Algorithm for Heterogeneous Wireless Networks", Conference Paper, Oct. 2-5, 2012, 7 pages, University of Technology, Sydney, Australia.

* cited by examiner

APPARATUS, SYSTEM, AND METHOD FOR RADIO INTERFACE SELECTION FOR IMS CONNECTION BASED ON POWER CONSIDERATIONS

PRIORITY

This application claims benefit of priority of U.S. provisional application Ser. No. 62/150,628 titled "Apparatus, System, and Method for Radio Interface Selection for IMS Connection Based on Power Considerations" filed Apr. 21, 2015, whose inventors were Gencer Cili, Ajoy K. Singh, and Ahmet Ferhat Yildirim, which is hereby incorporated by reference in its entirety as though fully and completely set forth herein.

FIELD

The present application relates to wireless communication systems, and more particularly to an apparatus, system, and method for radio interface selection for IMS connection based on power considerations.

DESCRIPTION OF THE RELATED ART

Wireless communication systems are rapidly growing in usage. Further, wireless communication technology has evolved from voice-only communications to also include the transmission of data, such as Internet and multimedia content.

Expanding traffic on mobile networks has increased the need for mobile data offloading, wherein a mobile device may access carrier provided services originally targeted for cellular networks over an alternative wireless network, such as Wi-Fi or WLAN.

Additionally, in cellular networks, and in particular long term evolution (LTE) networks, voice over IP (VoIP, e.g., VoLTE) is becoming the preferred way of establishing voice communication using mobile handsets. In An IMS (IP multimedia subsystem) server may be used in the core network of the cellular network as an IP layer connection point for routing the voice data. There are multiple ways of establishing connection to the IMS server from the mobile device, one of which is using E-UTRA Air Interface, e.g., through S-GW and P-GW. This method may be used most often and uses the cellular network's shared resources. Alternatively, a mobile device may use its WLAN radio, which is associated with a public or private access point, to establish communication with the IMS server, e.g., over an IPSEC tunnel to a secure gateway or ePDG node. This is possible because the IMS server resides on an IP based network that may be accessed through any Internet connected device. In either case, authentication is handled by the carrier and a secure connection may be established between the mobile device and the IMS server. This creates alternative paths for a mobile device to reach to the IMS server and receive service (e.g., for VoLTE).

In such situations, the mobile device has the capability of selecting among multiple interfaces or radio access technologies (RATs) for connecting to the cellular network (e.g., the IMS server of the cellular network).

SUMMARY

Embodiments described herein relate to an apparatus, system, and method for selecting a connection, e.g., for a real time application, such as a voice call. In one embodiment, a mobile device may communicate with a cellular network over a cellular connection and a Wifi or wireless local area network (WLAN) over a WLAN connection. The mobile device may determine one or more network parameters of the cellular network or the WLAN network, which may affect power consumption of the mobile device. Based on the network parameter(s), the mobile device may select the WLAN connection or the cellular connection for the mobile device.

The mobile device may determine other factors as well. For example, the mobile device may determine radio link conditions of the cellular connection and/or the WLAN connection and the selection may be also based on those radio link conditions. Additionally, the mobile device may determine a current condition of the mobile device, e.g., the battery level of the mobile device, and the selection may be based on that condition of the mobile device. For example, in low battery conditions, the selection of the connection may be based on the power consumption of that connection preferentially or exclusively over other factors, such as the radio link conditions discussed above.

The selection of the WLAN connection or the cellular connection may be made while the mobile device is not actively communicating (e.g., during idle mode). Alternatively, or additionally, the selection may be performed for a real time application such as a voice over IP (VoIP) call, e.g., for initiating or establishing the real time application and/or for determining whether to handover from one connection to another while the real time application is ongoing.

The techniques described herein may be implemented in and/or used with a number of different types of devices, including but not limited to cellular base stations, cellular phones, tablet computers, wearable computing devices, portable media players, and any of various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of the embodiments is considered in conjunction with the following drawings, in which.

Figure 1:
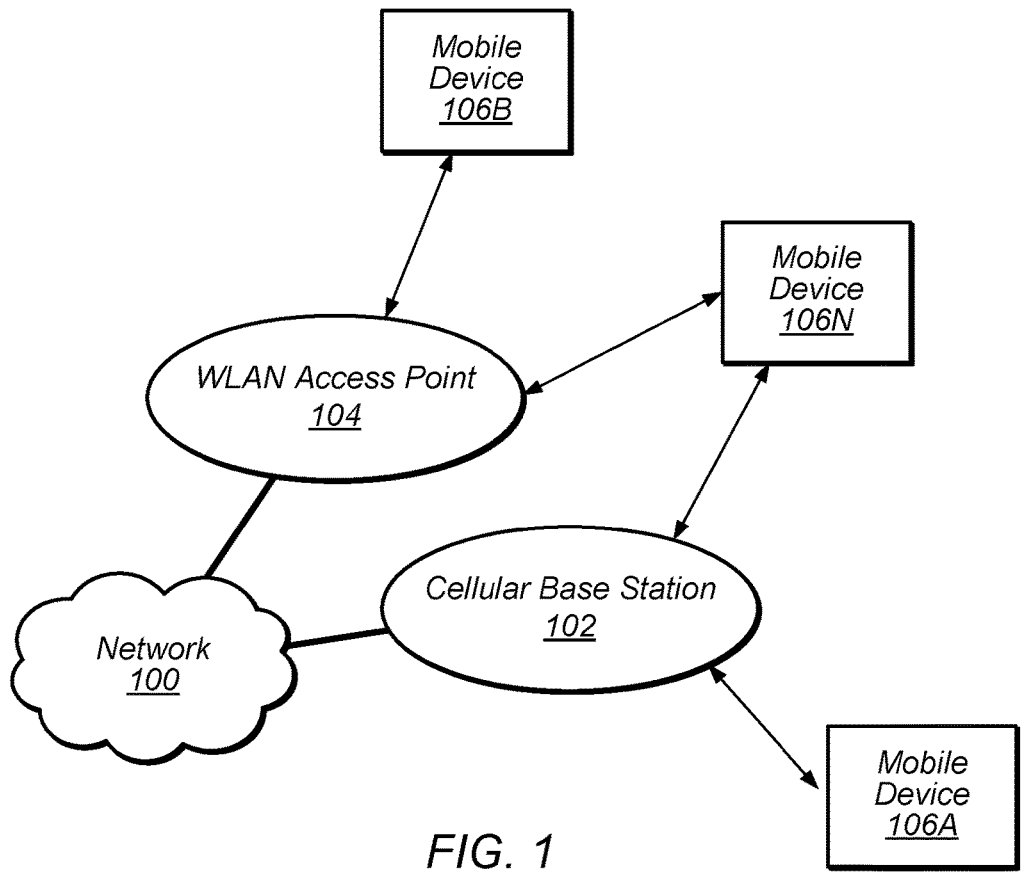
FIG. 1 illustrates an example (and simplified) wireless communication system, according to some embodiments.

While the features described herein may be susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Acronyms

The following acronyms are used in the present disclosure.
BS: Base Station
AP: Access Point
APN: Access Point Name
LTE: Long Term Evolution
VoLTE: Voice over LTE
VOIP: Voice Over IP
IMS: IP Multimedia Subsystem
MO: Mobile Originated
MT: Mobile Terminated
RAT: Radio Access Technology
TX: Transmit
RX: Receive
WLAN: Wireless Local Area Network
I-WLAN: Interworking WLAN
SIP: Session Initiation Protocol
PDN: Packet Data Network
PGW: PDN Gateway
SGW: Signaling Gateway
P-CSCF: Proxy Call Session Control Function
ePDG: evolved Packet Data Gateway
IFOM: IP Flow Mobility
SMOG: S2b Mobility based on GTP
GTP: GPRS Tunneling Protocol
GPRS: General Packet Radio Service

Glossary

Terms

The following is a glossary of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems or devices which are mobile or portable and which performs wireless communications. Examples of UE devices include mobile telephones or smart phones (e.g., iPhone™, Android™-based phones), portable gaming devices (e.g., Nintendo DS™, PlayStation Portable™, Gameboy Advance™, iPhone™), laptops, PDAs, portable Internet devices, music players, data storage devices, other handheld devices, as well as wearable devices such as wrist-watches, headphones, pendants, earpieces, etc. In general, the term "UE" or "UE device" can be broadly defined to encompass any electronic, computing, and/or telecommunications device (or combination of devices) which is easily transported by a user and capable of wireless communication.

Mobile Device—any of various types of communication devices which are mobile and are capable of communicating on a cellular network and a non-cellular network, such as Wi-Fi. A UE is an example of a mobile device.

Base Station—The term "Base Station" has the full breadth of its ordinary meaning, and at least includes a wireless communication station installed at a fixed location and used to communicate as part of a wireless cellular telephone system or cellular radio system.

Access Point—The term "Access Point" has the full breadth of its ordinary meaning, and at least includes a wireless communication device which offers connectivity to a wireless local area network (WLAN), such as a Wi-Fi network.

Wi-Fi—The term "Wi-Fi" has the full breadth of its ordinary meaning, and at least includes a wireless local area network technology based on the IEEE (Institute of Electrical and Electronics Engineers) 802.11 standards, and future revisions or enhancements to those standards.

Processing Element—refers to various elements or combinations of elements. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors.

Channel—a medium used to convey information from a sender (transmitter) to a receiver. It should be noted that since characteristics of the term "channel" may differ according to different wireless protocols, the term "channel" as used herein may be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 22 MHz wide while Bluetooth channels may be 1 Mhz wide. Other protocols and standards may include different definitions of channels. Furthermore, some standards may define and use multiple types of channels, e.g., different channels for uplink or downlink and/or different channels for different uses such as data, control information, etc.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Figure 2:
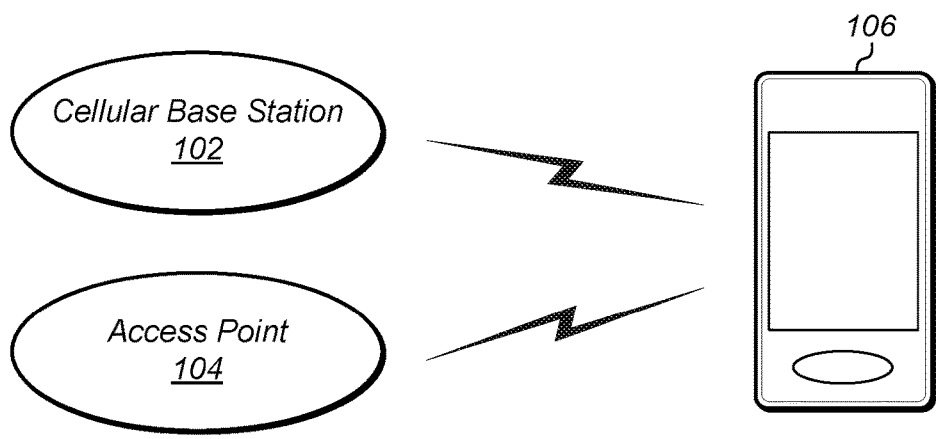
FIG. 2 illustrates a mobile device in communication with a cellular base station and an access point (AP), according to some embodiments.

FIGS. 1 and 2—Communication System

FIG. 1 illustrates an exemplary (and simplified) wireless communication system. It is noted that the system of FIG. 1 is merely one example of a possible system, and embodiments of the invention may be implemented in any of various systems, as desired.

As shown, the example wireless communication system includes a cellular base station 102 which may communicate over a transmission medium with one or more mobile devices 106A, 106B, etc., through 106N. Each of the mobile devices may be, for example, a "user equipment" (UE) or other types of devices as defined above.

The base station 102 may be a base transceiver station (BTS) or cell site, and may include hardware that enables wireless cellular communication with the mobile devices 106A through 106N. The base station 102 may also be equipped to communicate with a network 100 (e.g., a core network of a cellular service provider, a telecommunication network such as a public switched telephone network (PSTN), and/or the Internet, among various possibilities). Thus, the base station 102 may facilitate communication between the mobile devices and/or between the mobile devices and the network 100.

The communication area (or coverage area) of the base station may be referred to as a "cell." The base station 102 and the mobile devices 106 may be configured to communicate over the transmission medium using any of various cellular radio access technologies (RATs), also referred to as wireless cellular communication technologies, or telecommunication standards, such as GSM, UMTS (WCDMA, TD-SCDMA), LTE, LTE-Advanced (LTE-A), 3GPP2 CDMA2000 (e.g., 1×RTT, 1×EV-DO, HRPD, eHRPD), Wi-Fi, WiMAX etc. A typical wireless cellular communication system will include a plurality of cellular base stations which provide different coverage areas or cells, with handoffs between cells.

Additionally, the example wireless communication system may include one or more wireless access points (such as access point 104) which may be communicatively coupled to the network 100. Each wireless access point 104 may provide a wireless local area network (WLAN) for communication with mobile devices 106. These wireless access points may comprise Wi-Fi access points. Wireless access point 104 may be configured to support cellular network offloading and/or otherwise provide wireless communication services as part of the wireless communication system illustrated in FIG. 1.

1) Cellular base station 102 and other similar base stations and 2) access points (such as access point 104) operating according to a different wireless communication standard may thus be provided as a network which may provide continuous or nearly continuous overlapping service to mobile devices 106 and similar devices over a wide geographic area via one or more wireless communication standards.

Thus, while base station 102 may act as a "serving cell" for a UE 106 as illustrated in FIG. 1, each mobile device 106 may also be capable of receiving signals from (and possibly within communication range of) one or more other cells (which might be provided by other base stations (not shown) and/or wireless local area network (WLAN) access points, which may be referred to as "neighboring cells" or "neighboring WLANs" (e.g., as appropriate), and/or more generally as "neighbors".

FIG. 2 illustrates mobile device 106 (e.g., one of the devices 106A through 106N) in communication with both a Wi-Fi access point 104 and a cellular base station 102. The mobile device 106 may be a device with both cellular communication capability and non-cellular communication capability, e.g., Wi-Fi capability, such as a mobile phone, a hand-held device, a computer or a tablet, or virtually any type of wireless device.

The mobile device 106 may include a processor that is configured to execute program instructions stored in memory. The mobile device 106 may perform any of the method embodiments described herein by executing such stored instructions. Alternatively, or in addition, the mobile device 106 may include a programmable hardware element such as an FPGA (field-programmable gate array) that is configured to perform any of the method embodiments described herein, or any portion of any of the method embodiments described herein.

In some embodiments, the mobile device 106 may be configured to communicate using any of multiple radio access technologies/wireless communication protocols. For example, the mobile device 106 may be configured to communicate using any of various cellular communication technologies, such as GSM, UMTS, CDMA2000, LTE, LTE-A, etc. The mobile device may also be configured to communicate using any of various non-cellular communication technologies such as WLAN/Wi-Fi, or GNSS. Other combinations of wireless communication technologies are also possible.

The mobile device 106 may include one or more antennas for communicating using one or more wireless communication protocols or technologies. In one embodiment, the mobile device 106 might be configured to communicate using either of CDMA2000 (1×RTT/1×EV-DO/HRPD/eH-RPD) or LTE using a single shared radio and/or GSM or LTE using the single shared radio. The shared radio may couple to a single antenna, or may couple to multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the mobile device 106 may share one or more parts of a receive and/or transmit chain between multiple wireless communication technologies, such as those discussed above.

In some embodiments, the mobile device 106 may include separate transmit and/or receive chains (e.g., including separate RF and/or digital radio components) for each wireless communication protocol with which it is configured to communicate. As a further possibility, the mobile device 106 may include one or more radios which are shared between multiple wireless communication protocols, and one or more radios which are used exclusively by a single wireless communication protocol. For example, the mobile device 106 might include a shared radio for communicating using either of LTE or 1×RTT (or LTE or GSM), and separate radios for communicating using each of Wi-Fi and Bluetooth. Other configurations are also possible.

Figure 3:
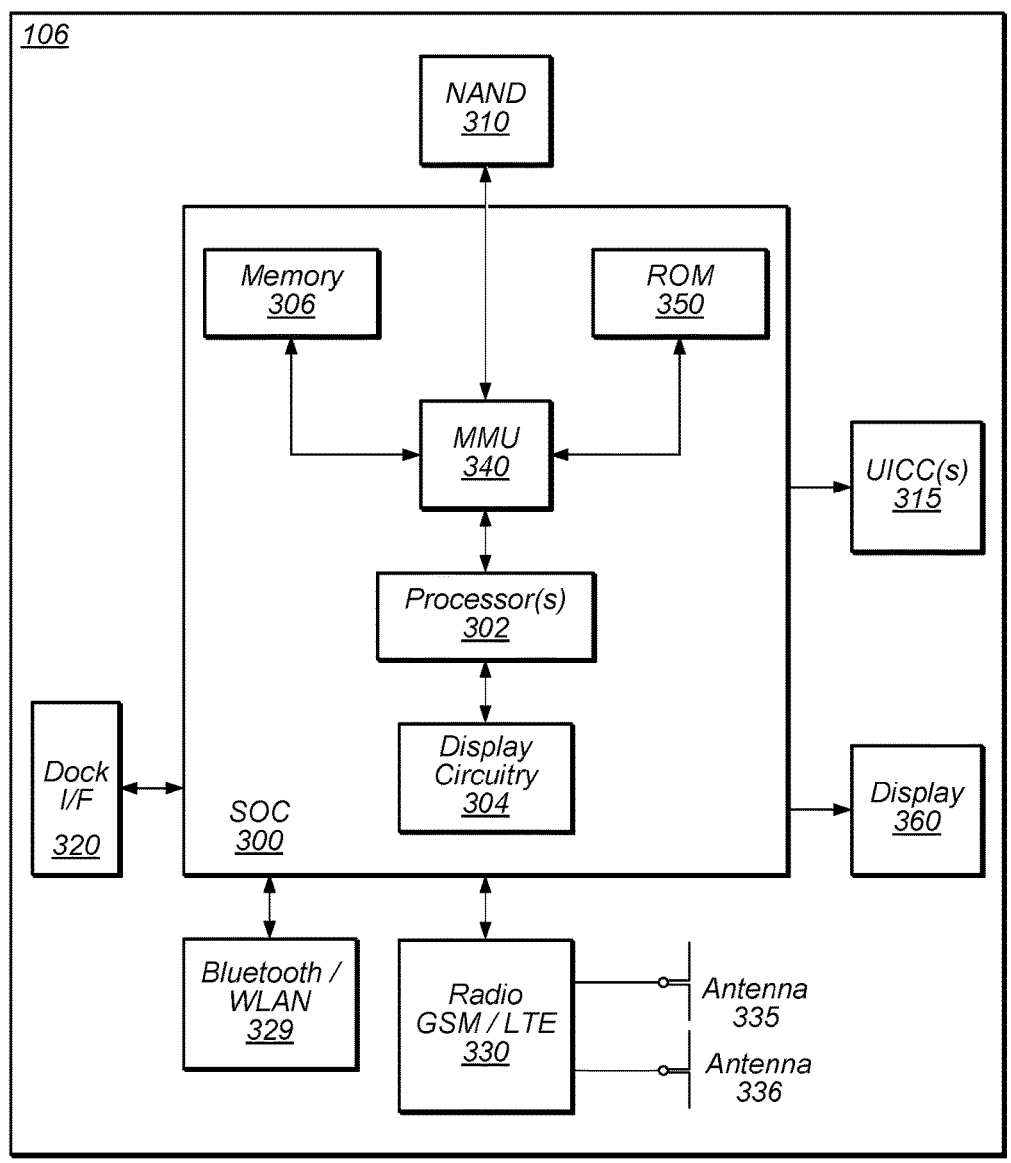
FIG. 3 illustrates an example block diagram of a mobile device, according to some embodiments.

FIG. 3—Mobile Device Block Diagram

FIG. 3 illustrates an example simplified block diagram of a mobile device 106. As shown, the mobile device 106 may include a system on chip (SOC) 300, which may include portions for various purposes. The SOC 300 may be coupled to various other circuits of the mobile device 106. For example, the mobile device 106 may include various types of memory (e.g., including NAND flash 310), a connector interface 320 (e.g., for coupling to a computer system, dock, charging station, etc.), the display 360, cellular communication circuitry 330 such as for LTE, GSM, etc., and short range wireless communication circuitry 329 (e.g., Bluetooth™ and WLAN circuitry). The mobile device 106 may further comprise one or more smart cards 315 that comprise SIM (Subscriber Identity Module) functionality, such as one or more UICC(s) (Universal Integrated Circuit Card(s)) cards 315. The cellular communication circuitry 330 may couple to one or more antennas, preferably two antennas 335 and 336 as shown. The short range wireless communication circuitry 429 may also couple to one or both of the antennas 335 and 336 (this connectivity is not shown for ease of illustration).

As shown, the SOC 300 may include processor(s) 302 which may execute program instructions for the mobile device 106 and display circuitry 304 which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, cellular communication circuitry 330, short range wireless communication circuitry 329, connector I/F 320, and/or display 360. The MMU 340 may be configured to perform memory protection and page table translation or set up. In some embodiments, the MMU 340 may be included as a portion of the processor(s) 302.

In one embodiment, as noted above, the mobile device 106 comprises at least one smart card 315, such as a UICC 315, which executes one or more Subscriber Identity Module (SIM) applications and/or otherwise implement SIM functionality. The at least one smart card 315 may be only a single smart card 315, or the mobile device 106 may comprise two or more smart cards 315. Each smart card 315 may be embedded, e.g., may be soldered onto a circuit board in the mobile device 106, or each smart card 3105 may be implemented as a removable smart card, an electronic SIM (eSIM) or any combination thereof. Any of various other SIM configurations are also contemplated.

As noted above, the mobile device 106 may be configured to communicate wirelessly using multiple radio access technologies (RATs). The mobile device 106 may be configured to communicate according to a WLAN RAT and/or one or more cellular RATs, e.g., such as communicating on both WLAN and cellular at the same time.

As described herein, the mobile device 106 may include hardware and software components for implementing the features and methods described herein. The processor 302 of the mobile device 106 may be configured to implement part or all of the features described herein, e.g., by executing program instructions stored on a memory medium (e.g., a non-transitory computer-readable memory medium). Alternatively (or in addition), processor 302 may be configured as a programmable hardware element, such as an FPGA (Field Programmable Gate Array), or as an ASIC (Application Specific Integrated Circuit). Alternatively (or in addition) the processor 302 of the mobile device 106, in conjunction with one or more of the other components 300, 304, 306, 310, 320, 330, 335, 340, 350, 360 may be configured to implement part or all of the features described herein.

Figure 4:
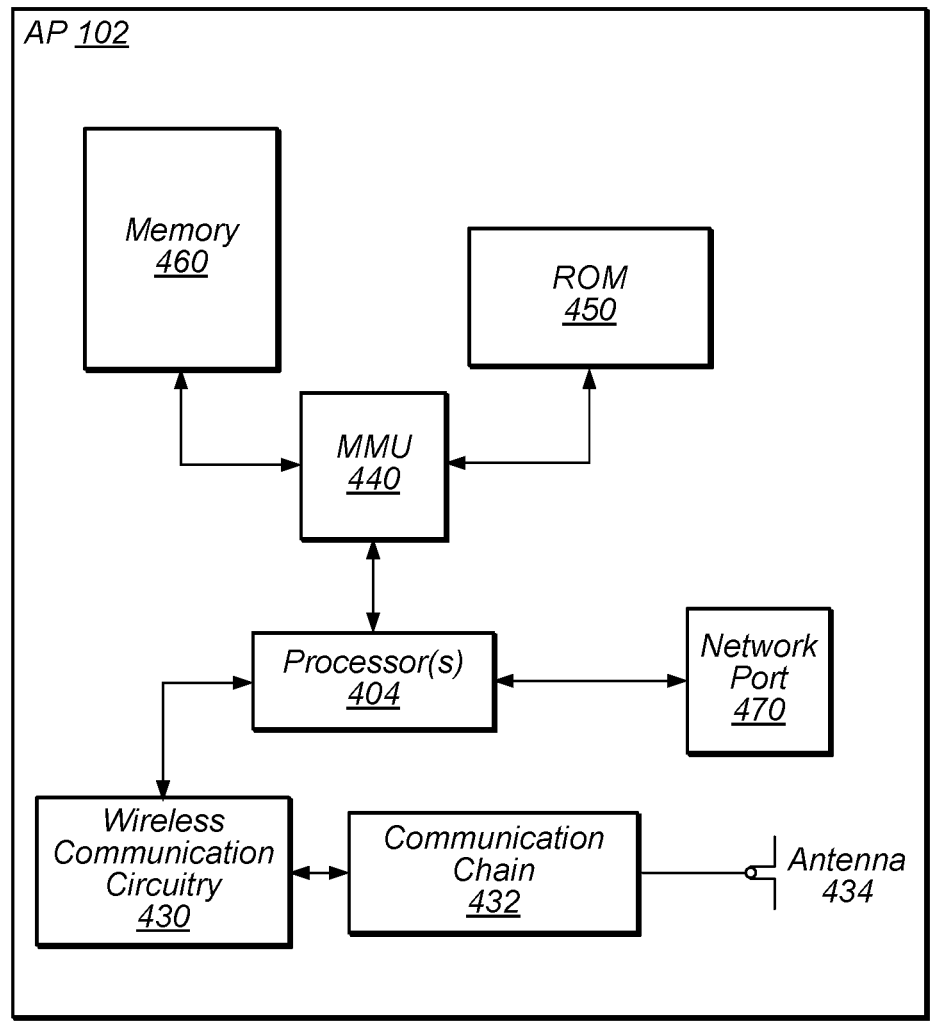
FIG. 4 illustrates an example block diagram of an access point, according to some embodiments.

FIG. 4—Exemplary Block Diagram of an Access Point

FIG. 4 illustrates an example block diagram of an access point 104. It is noted that the access point 104 of FIG. 4 is merely one example of a possible access point. As shown, the access point 104 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The access point 104 may include at least one network port 470. The network port 470 may be configured to couple to a network, such as the Internet, and provide a plurality of devices, such as mobile devices 106, access to the network as described above in FIGS. 1 and 2.

The network port 470 (or an additional network port) may also be configured to couple to a cellular network, e.g., a core network of a cellular service provider. The core network may provide mobility related services and/or other services to a plurality of devices, such as mobile devices 106. In some cases, the network port 470 may couple to a telephone network via the core network, and/or the core network may provide a telephone network (e.g., among other mobile devices serviced by the cellular service provider).

The access point 104 may include at least one antenna 434, and possibly multiple antennas. The at least one antenna 434 may be configured to operate as a wireless transceiver and may be further configured to communicate with mobile devices 106 via radio 430. The antenna 434 communicates with the wireless communication circuitry 430 via communication chain 432. Communication chain 432 may be a receive chain, a transmit chain or both. The radio 430 may be configured to communicate via various wireless local area network standards, including, but not limited to Wi-Fi (e.g., 802.11 standard communication).

The block diagram of FIG. 4 may also apply to cellular base station 102, except that communication may be performed using any of various cellular communication technologies.

Figure 5:
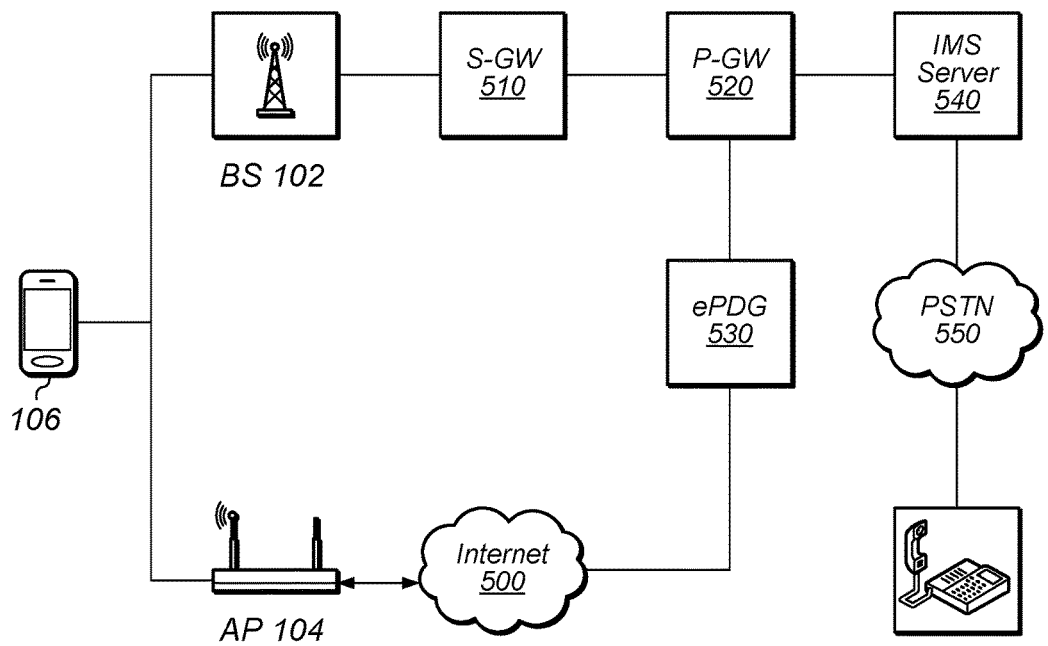
FIG. 5 is a block diagram of an example communication system, according to some embodiments.

FIG. 5—Exemplary Wireless Communication System

FIG. 5 illustrates an example wireless communication system according to one embodiment. As shown, the mobile device 106 may communicate with a cellular network via cellular base station 102. The cellular base station 102 may communicate with a Serving Gateway (SGW) 510. The SGW 510 is responsible for handovers with neighboring base stations. The SGW 510 couples to a Packet Data Network (PDN) 520 Gateway, or (PGW) 520. The PGW 520 operates to interface between the cellular and WLAN networks. Together the SGW 510 and the PGW 520 make up the evolved packet core (EPC).

As shown, mobile device 106 may also communicate with an access point 104, which in this embodiment may be a WLAN access point presenting a WLAN network. The Wi-Fi access point 104 may couple through a network, such as the Internet 500, to an evolved Packet Data Gateway (ePDG) 530. The ePDG 530 is utilized in the network function of 4G mobile core networks, known as the evolved packet core (EPC) mentioned above, as well as future mobile networks, such as 5G networks. The ePDG 530 may act as an interface between the EPC and non-3GPP networks that may use secure access, such as Wi-Fi and femtocell access networks.

The PGW 520 may couple to an IMS (IP Multimedia Subsystem) service layer or server 540. The IMS server 540 may comprise a computer system with a processor and memory which performs various operations as described herein. The IMS server 540 may implement an IMS Service Layer. The IMS server 540 may also implement a Proxy Call Session Control Function (P-CSCF). The P-CSCF may act as the entry point to the IMS domain and may serve as the outbound proxy server for the mobile device 106. The mobile device 106 may attach to the P-CSCF prior to performing IMS registrations and initiating SIP sessions. The P-CSCF may be in the home domain of the IMS operator, or it may be in the visiting domain where the mobile device is currently roaming.

The IMS server may couple to other networks such as the public switched telephone network (PSTN) 550 or other types of communication networks, e.g., for communicating with other communication devices, such as a standard POTS telephone (shown), another mobile device, etc.

FIG. 6

Figure 6:
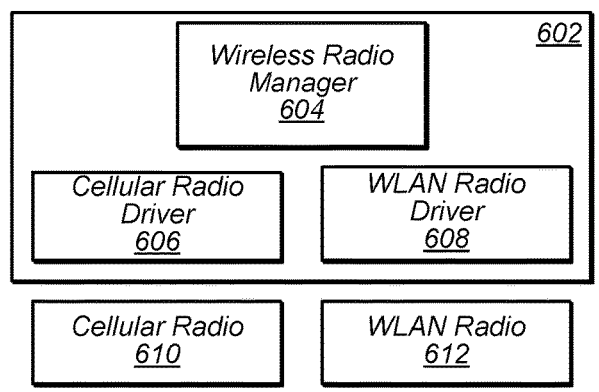
FIG. 6 illustrates various WLAN communication components present in the mobile device, according to some embodiments.

FIG. 6 illustrates example functionality that may be present in the mobile device 106. As shown, the mobile device 106 may comprise a RAT block 602 that comprises a wireless radio manager 604, a cellular radio driver 606, and a WLAN radio driver 608. The wireless radio manager 604 may be configured to receive various statistics from the cellular radio driver 606 and/or the WLAN radio driver 608 and determine whether to use one or more of available cellular and WLAN connections based on the statistics. In particular, as discussed below, in one embodiment, the wireless radio manager 604 may be configured to determine whether a WLAN connection should be IMS registered and/or whether an active call should be handed over from WLAN to cellular or from cellular to WLAN, among other possible functionalities.

In one embodiment, the communication center 606 may manage or control cellular radio 610 and WLAN radio driver 608 may manage or control WLAN radio 612. Although not shown, the RAT block 602 may include a symptoms manager that may report current connection information (e.g., connection metrics or statistics) to the wireless radio manager 604. Elements of the RAT block 602 may be implemented as software or firmware executable by a processor and/or in any desirable manner.

RAT Selection Based on Power Consumption

In some embodiments, the mobile device, e.g., the wireless radio manager 604 of the mobile device 106, may operate to determine whether to use a WLAN connection and/or cellular (e.g., LTE) connection for a real-time application or IP session, such as a voice over IP (VoIP) or video over IP call. With WLAN calling, a user may be allowed to make a WLAN call while connected to WLAN access points (e.g., even including untrusted WLAN access points such as those found at coffee shops, airports, corporate locations, and in residences). In some embodiments, WLAN calling (e.g., carrier WLAN calling) may be enabled for certain cellular subscriptions.

According to various embodiments described herein, the choice of whether to use a WLAN or cellular RAT for a call (e.g., handover during a call or selection prior to a call) may include factors based on power consumption of the mobile device. For example, the mobile device may be configured to implement a power-aware, dynamic selection of the radio interface for establishing voice communication using an IMS server of the cellular network. In many instances, the default radio interface to establish the link to the IMS server might not be power efficient due to radio conditions or network parameters, among other factors. In these scenarios, the mobile device may decide to use an alternative radio interface to provide the same service, but with less power cost. For example, instead of choosing the preferred radio interface (e.g., WLAN vs. cellular) by purely comparing the radio or link conditions, the mobile device may also consider the power consumption over the possible links and make a power efficient RAT selection decision.

In one embodiment, the selection of the RAT for the real time application or IP session (e.g., a VoIP call) may be based on the power consumption effects of one or more network parameters currently implemented by the available RATs under consideration. One such network parameter is whether connected mode discontinuous reception (CDRX) state is supported, e.g., for the cellular connection. Networks supporting this state may have significantly less power cost for the mobile device during a real time IP session, such as a VoIP call. For example, based on experimental data, this power savings can be as high as 44%. As another example, power savings of about 42% may be achieved when comparing the power consumption during the call when the mobile device uses its WLAN interface to reach the IMS server rather than when using a cellular link that does not support CDRX state. Such high savings may prolong the battery life significantly.

Accordingly, in some embodiments, if the mobile device detects that the network does not support CDRX, and a WLAN connection is available, the mobile device may preferentially choose the WLAN interface over the cellular interface for IMS calls. As a further possibility, if the device establishes a VoIP call and the CDRX parameters for the dedicated bearer are not power optimized for a QCI-1 bearer, the mobile device may handoff to IMS using the WLAN interface. In some embodiments, this feature can be further optimized so it is implemented only in home networks to avoid user inconvenience in terms of billing (e.g., to avoid cellular-roaming). However, these billing preferences may be overridden in certain situations, e.g., if the battery level is less than a pre-determined threshold, such as 10% and/or may be user configurable, if desired.

In some embodiments, such as during standby, when the mobile device is associated with a WLAN access point, it may be required to periodically send small "presence" data packets to the IMS server to keep the link alive. For example, three exemplary different keep alive timers may be used, including: 1) a NAT keep alive timer to keep the NAT port open for receiving incoming messages, 2) an IKE (Internet Key Exchange) (e.g., IKEv2) dead peer detection keep alive timer to check if the ePDG connection is alive, and 3) an IMS reregister timer for refreshing IMS registration with the IMS server. Note that the NAT keep alive timer and the IKE keep alive timer may be specific to IMS connections over WLAN. In some embodiments, the IPSEC tunnel between the UE and the ePDG/SecureGW node may be kept alive via uplink/downlink IKE keep alive messages. If the period of these data transmissions is set too small, it may increase the burden on the mobile device battery. More specifically, every time this "presence" data needs to be transmitted, the entire transmission system of the mobile device may be required to wake up, create the packet, and transmit it through the WLAN interface. While some networks allow for 30-60 minute timers, some use much lower values, such as a few minutes, or in some instances seconds, either by mistake or with some other motivation. In these cases of low value timers, the standby battery life is impacted significantly, e.g., because WLAN radio of the mobile device may not be optimized for this sort of traffic. On the other hand, cellular radios are generally designed for optimizing power use in this situation (e.g., using for DRX operation in LTE).

Accordingly, if a mobile device detects one or more unfavorable keep alive timers, it may preferentially handover, e.g., to using a cellular connection (e.g., LTE), e.g., since the IKE keep alive timer may only be applicable to IMS connections over WLAN via IPSEC tunnel as well as the NAT keep alive timer to keep the NAT port open. Thus, in cases of frequent transmissions of these two keep alive timers, the mobile device may favor the cellular link by performing handover. On the other hand, the IMS reregister timer, at least in ideal cases, should not matter according to the chosen radio interface, and hence may not affect the handover decisions. In particular, the IMS reregister timer may be applicable in either cellular or WLAN connections. However, in some networks (e.g., improperly configured networks) an IMS reregister timer may have a value that is inappropriate or may have different values for WLAN and cellular connections, and accordingly its value may impact the choice between using WLAN and cellular RATs.

In some embodiments, at a certain battery level (e.g., 10% battery remaining), the mobile device may make IMS radio selections based purely on power considerations without comparing the link or radio conditions of the RATs under consideration. For example, the power consumption for the current conditions of each RAT may be determined and the RAT with the lowest power consumption may be selected, e.g., regardless of the link conditions.

In comparing the power consumption of the RATs under consideration, the power consumption under one or more the following states may be considered (among many other possibilities): power consumption when mobile device is IMS registered on WLAN (e.g., and camped on LTE), power consumption when mobile device is IMS registered on LTE (e.g., WLAN either off, or LPAS), power consumption when mobile device is in standby mode (e.g., AP sleep), power consumption of baseband if camped on LTE and monitoring PCH every DRX (e.g., 1.28 s) and assuming stationary conditions (no reselection etc.), power consumption when mobile device is using WLAN, in LPAS (e.g., meaning no IMS registration), and/or power consumption when mobile device is using WLAN (e.g., with IMS registration).

For example, as one scenario, a mobile device may be in communication with a base station using a cellular RAT (e.g., LTE) in idle mode, without an active connection to WLAN. Accordingly, power consumption may be lower to continue to use the cellular RAT without switching to WLAN, e.g., since the mobile device may be more efficient using a cellular connection (e.g., LTE with DRX) than with WLAN. However, if the mobile device is switching between base stations often (e.g., based on the location of the mobile device or the mobility of the mobile device) and/or the mobile device is already performing data communication using WLAN, it may be more efficient to simply use the WLAN RAT rather than cellular RAT. Many other scenarios apply and are envisioned.

Figure 7:
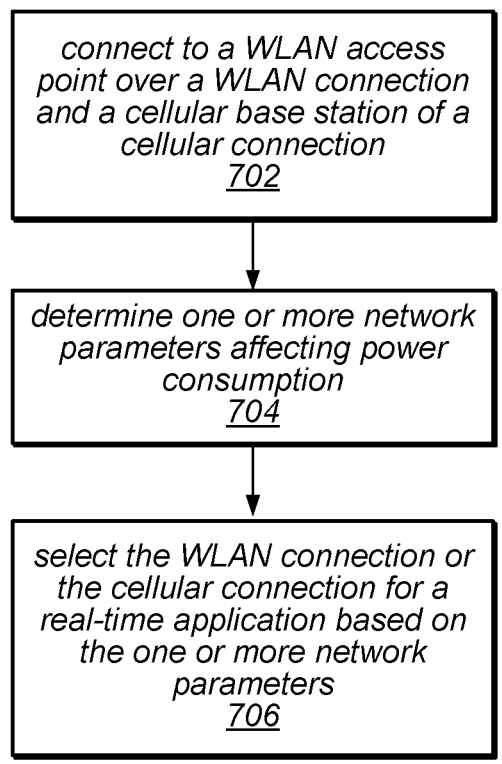
FIGS. 7 and 8 are flowchart diagrams illustrating exemplary methods for selecting among a plurality of possible connections for a real-time application based on power consumption, according to some embodiments.

FIG. 7—Selecting a RAT Based on Power Consumption

FIG. 7 illustrates one embodiment of a method of selecting a RAT, e.g., for a real-time application, such as VoIP, based on power consumption. The method shown in FIG. 7 may be used in conjunction with any of the computer systems or devices shown in the above Figures, among other devices. For example, the method of FIG. 7 may be performed by mobile device 106. In various embodiments, some of the method elements shown may be performed concurrently, in a different order than shown, or may be omitted. Additional method elements may also be performed as desired. Note that while WLAN and LTE are described herein, any combination of RATs are envisioned. As shown, this method may operate as follows.

In 702, a mobile device may connect to an access point, e.g., a WLAN access point providing a WLAN network for connection to the Internet. Additionally, the mobile device may be connected to a cellular network, e.g., an LTE network. Alternatively, the mobile device may simply have access to both a WLAN access point and an LTE network and may be connected to one or both of these RATs, as desired.

In 704, the mobile device may determine one or more network or connection parameters of the WLAN connection and/or the LTE connection that affect power consumption for the mobile device. For example, the mobile device may determine whether the LTE connection supports CDRX, since power consumption may be significantly higher when CDRX is not used. Additionally, or alternatively, the mobile device may determine various keep-alive timers that require messages from the mobile device for each connection. For example, NAT and IKE dead peer detection keep alive timers may be used for WLAN connections (e.g., and not for LTE connections). If these values are too short, they may significantly impact power consumption of the mobile device when using the WLAN connection. Additionally, the mobile device may determine the configuration of an IMS reregister timer (e.g., which may be used for both WLAN and LTE connections) to determine if the network has properly configured the timer and/or if different values are used for WLAN and LTE. In either case, the IMS reregister timer may affect power consumption. Other network parameters are also envisioned.

704 may be performed when connections are established, e.g., when the LTE connection and/or WLAN connection is established. Additionally, these network parameters may be used when selecting among multiple different possible connections (e.g., from among different WLAN access points or different cellular base stations). For example, if a first WLAN connection has a very short NAT or IKE keep alive timer, but a second WLAN connection has a longer NAT or IKE keep alive timer, the second one may be preferentially selected over the first. Similarly, base stations or networks supporting CDRX may be selected over ones that do not, if possible.

In 706, the mobile device may select whether to use a cellular connection or a WLAN connection, based on one or more of the network parameters discussed in 704. For example, the mobile device may select WLAN preferentially over LTE when CDRX is not supported by the cellular connection and/or if CDRX is poorly configured (e.g., if the CDRX cycle if shorter than recommended or the CDRX inactivity timer or the onDuration timer is longer than required).

Alternatively, or additionally, the mobile device may select LTE preferentially over WLAN when the WLAN keep alive timers are so short that they may have a significant power consumption effect on the mobile device. Combinations of network parameters may also be considered.

The method may also include determining characteristics of the radio links of each connection and using those characteristics in choosing the connection. For example, any of various characteristics or metrics may be determined, such as RSSI, SNR, RSRQ, BLER, and/or any desirable metrics, e.g., that measure the quality or reliability of the radio links of each connection. Other factors may also be considered, such as the movement speed of the mobile device, location of the mobile device, billing considerations (e.g., whether the mobile device is roaming), etc. Accordingly, the selection of the connection (e.g., cellular or WLAN) may be determined not only based on the power parameters determined in 704, but also based on other factors, such as the link conditions discussed above.

Figure 8:
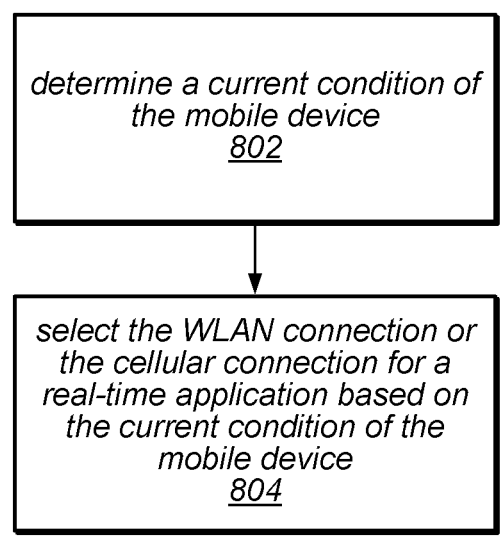

FIG. 8—Selecting a RAT Based on Power Consumption

FIG. 8 illustrates one embodiment of a method of selecting a RAT, e.g., for a real-time application, such as VoIP, based on power consumption. The method shown in FIG. 8 may be used in conjunction with any of the computer systems or devices shown in the above Figures, among other devices. For example, the method of FIG. 8 may be performed by mobile device 106. In various embodiments, some of the method elements shown may be performed concurrently, in a different order than shown, or may be omitted. Additional method elements may also be performed as desired. Note that while WLAN and LTE are described herein, any combination of RATs are envisioned. As shown, this method may operate as follows.

In 802, a mobile device may determine a current condition of the mobile device. For example, the mobile device may determine the current battery level of the mobile device. Other conditions are also envisioned, such as whether the device is being actively used, the location or movement speed of the device, etc.

In 804, the mobile device may modify its method of performing RAT selection (e.g., as described in FIG. 7) based on the current condition of the mobile device. For example, the mobile device may normally use a first algorithm for selecting among different RATs, e.g., for a real-time application (e.g., a VoIP call), which may use the current link conditions for the RATs and/or the associated power consumption for the RATs (e.g., based on the network parameters determined in FIG. 7). However, in response to a current condition of the mobile device reaching a particular point (e.g., the battery level falling below a threshold value, such as 5%, 10%, 25%, etc.), the mobile device may switch to using a second algorithm, e.g., which makes the selection based on power consumption considerations, e.g., excluding link condition considerations. However, it should be noted that extremely poor link conditions may result in higher power usage, so a minimum link condition may be necessary.

In some embodiments, a plurality of different regimes may be used. For example, during high battery conditions (e.g., greater than 75% battery remaining), RAT selection may be based on link conditions or other factors without considering power consumption of the selection. During medium battery conditions (e.g., between 25% and 75% battery remaining), RAT selection may be based on link considerations and power consumption (among other possible factors). During low battery conditions (e.g., less than 25% or 10% battery remaining), RAT selection may be performed based on power consumption only. Other embodiments and scenarios are also envisioned.

The method of FIG. 8 may be particularly useful for networks that limit power consumption selection by default. For examples, some cellular networks may require that cellular links be preferentially used over WLAN links by default. However, the mobile device may begin to take into account power consumption when the mobile device reaches a critical condition (e.g., low battery state).

The methods described above may be used at various times. For example, the methods of FIGS. 7 and 8 may be used while the mobile device is in idle mode (e.g., while not in a voice call and/or real-time application). In this case, the method may be used to determine whether to maintain one or more of the connections. For example, the mobile device may maintain an active connection to one or a subset of the connections based on the power consumption associated with the determined parameters. In one embodiment, these methods may be used to determine whether to perform IMS registration of the WLAN connection.

Alternatively, these methods may be used for determining which connection to use for an upcoming or ongoing real-time application (e.g., a VoIP call). For example, these methods may be used while the mobile device is using a cellular connection for a real-time application (e.g., a voice call) to determine whether to handover the real-time application from cellular to WLAN (or vice versa).

These two scenarios may involve making the decision between the two RATs or connections in different manners, e.g., there may be stricter thresholds or processes used while in idle mode versus during an active call, e.g., since the mobile device may spend most of its time in idle mode. Alternatively, the same criteria and decision making processes may be used in either situation. Other situations are also envisioned.

Embodiments

The following paragraphs describe various embodiments according to the description herein.

A method for selecting a connection for a real time application, comprising: at a mobile device: communicating with a cellular network over a cellular connection; communicating with a WLAN network over a WLAN connection; determining one or more network parameters of the cellular network or the WLAN network, wherein the one or more network parameters affect power consumption of the mobile device; based on the one or more network parameters, determining whether to use the WLAN connection or the cellular connection in a real-time application of the mobile device.

The method of any of these paragraphs, wherein the real-time application comprises a voice call.

The method of any of these paragraphs, wherein determining the one or more network parameters comprises determining whether the cellular connection supports properly configured CDRX (connected mode discontinuous reception).

The method of any of these paragraphs, wherein the one or more network parameters comprise one or more keep alive timers associated with the WLAN connection.

The method of any of these paragraphs, wherein the one or more keep alive timers comprise a NAT keep alive timer.

The method of any of these paragraphs, wherein the one or more keep alive timers comprise an IKE (Internet Key Exchange) dead peer detection keep alive timer.

The method of any of these paragraphs, wherein the cellular connection comprises a long term evolution (LTE) cellular connection.

A method for selecting a connection for a real time application, comprising: at a mobile device: communicating with a cellular network over a cellular connection; communicating with a WLAN network over a WLAN connection; determining a condition of the mobile device; based on the condition of the mobile device, determining whether to use the WLAN connection or the cellular connection in a real-time application of the mobile device based only on power consumption of a battery of the mobile device.

The method of any of these paragraphs, wherein determining the condition of the mobile device comprises determining a battery level of the mobile device.

The method of any of these paragraphs, wherein determining whether to use the WLAN connection or the cellular connection for use in a real-time application of the mobile device based only on power consumption of a battery of the mobile device is performed based on the battery level of the mobile device falling under a threshold.

The method of any of these paragraphs, wherein the threshold is 10%.

A mobile device, comprising: at least one antenna; a first radio, wherein the first radio is configured to perform cellular communication with a cellular base station using at least one cellular radio access technology (RAT); a second radio, wherein the second radio is configured to perform Wi-Fi communication with a Wi-Fi access point; at least one processor coupled to the first and second radios, wherein the mobile device is configured to perform voice and/or data communications; wherein the mobile device is configured to perform the method of any of these paragraphs.

A computer program comprising instructions for performing any of the methods of any of these paragraphs.

An apparatus comprising means for performing any of the method elements of any of these paragraphs.

A method that includes any action or combination of actions as substantially described herein in the Detailed Description.

A method as substantially described herein with reference to each or any combination of the Figures or with reference to each or any combination of paragraphs in the Detailed Description.

A wireless device configured to perform any action or combination of actions as substantially described herein in the Detailed Description.

A wireless device that includes any component or combination of components as described herein in the Detailed Description as included in a wireless device.

A non-volatile computer-readable medium that stores instructions that, when executed, cause the performance of any action or combination of actions as substantially described herein in the Detailed Description.

An integrated circuit configured to perform any action or combination of actions as substantially described herein in the Detailed Description.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method for selecting a connection for a real time application, comprising:
   at a mobile device:
   establishing a cellular connection with a cellular network;
   establishing a wireless local area network (WLAN) connection with a WLAN network;
   after establishing the cellular connection with the cellular network, determining a first one or more current network parameters of the cellular network, wherein the one or more current network parameters affect power consumption of the mobile device while communicating over the cellular connection;
   after establishing the WLAN connection with the WLAN network, determining a second one or more current network parameters of the WLAN network, wherein the second one or more current network parameters affect power consumption of the mobile device while communicating over the WLAN connection;
   based on the first one or more current network parameters and the second one or more current network parameters, dynamically determining whether to use the WLAN connection or the cellular connection in a real-time application of the mobile device, wherein said determining is based on the power consumption of the mobile device using the first one or more current network parameters while communicating over the cellular connection and the power consumption of the mobile device using the second one or more current network parameters while using the WLAN connection.

2. The method of claim 1, wherein the real-time application comprises a voice call.

3. The method of claim 1, wherein determining the one or more current network parameters comprises determining CDRX (connected mode discontinuous reception) parameters and wherein determining whether to use the WLAN connection or the cellular connection is based on power consumption of the cellular connection based on the CDRX parameters.

4. The method of claim 1, wherein the one or more current network parameters comprise one or more keep alive timers associated with the WLAN connection and wherein determining whether to use the WLAN connection or the cellular connection is based on values of the one or more keep alive timers associated with the WLAN connection.

5. The method of claim 4, wherein the one or more keep alive timers comprise a NAT keep alive timer.

6. The method of claim 4, wherein the one or more keep alive timers comprise an IKE (Internet Key Exchange) dead peer detection keep alive timer.

7. The method of claim 4, wherein determining whether to use the WLAN connection or the cellular connection comprises comparing at least a value of a first keep alive timer to a threshold and wherein determining whether to use the WLAN connection or the cellular connection is based on the comparison of the value of the first keep alive timer to the threshold.

8. The method of claim 1, further comprising:
determining radio link conditions of the cellular connection and the WLAN connection, wherein said determining whether to use the WLAN connection or the cellular connection is based on the radio link conditions of the cellular connection or the WLAN connection.

9. The method of claim 1, further comprising:
determining a battery level of the mobile device, wherein said determining whether to use the WLAN connection or the cellular connection is based on the battery level of the mobile device.

10. The method of claim 1, further comprising:
selecting among multiple different possible connections based on the current network parameters, wherein the multiple different possible connections comprise either or both of:
a plurality of WLAN access points, or
a plurality of cellular base stations.

11. An apparatus configured for inclusion in a mobile device, comprising:
a processing element, wherein the processing element is configured to:
determine a first one or more current network parameters of a cellular connection with a cellular network;
determine a first one or more radio link metrics of the cellular connection;
determine a second one or more current network parameters of a wireless local area network (WLAN) connection with a WLAN network;
determine a second one or more radio link metrics of the WLAN connection; and
dynamically select the WLAN connection or the cellular connection in a real-time application of the mobile device based on the first one or more current network parameters, the first one or more radio link metrics, the second one or more current network parameters, and the second one or more radio link metrics, wherein said dynamically selecting the WLAN connection or the cellular connection is based on power consumption of the mobile device operating according to the first one or more current network parameters of the cellular connection and the second one or more current network parameters of the WLAN connection.

12. The apparatus of claim 11, wherein selecting the WLAN connection or the cellular connection is performed for a real time application.

13. The apparatus of claim 11, wherein selecting the WLAN connection or the cellular connection is performed for a voice over IP (VoIP) call.

14. The apparatus of claim 11, wherein determining the first one or more current network parameters comprises determining whether the cellular connection supports CDRX (connected mode discontinuous reception) and wherein selecting the WLAN connection or the cellular connection is based on whether the cellular connection supports CDRX.

15. The apparatus of claim 11, wherein the second one or more current network parameters comprise one or more keep alive timers associated with the WLAN connection and wherein selecting the WLAN connection or the cellular connection is based on values of the one or more keep alive timers associated with the WLAN connection.

16. The apparatus of claim 15, wherein the one or more keep alive timers comprise one or more of a NAT keep alive timer or an IKE (Internet Key Exchange) dead peer detection keep alive timer.

17. A mobile device, comprising:
at least one antenna;
a first radio, wherein the first radio is configured to perform cellular communication with a cellular base station using at least one cellular radio access technology (RAT);
a second radio, wherein the second radio is configured to perform Wi-Fi communication with a Wi-Fi access point;
at least one processor coupled to the first and second radios, wherein the mobile device is configured to perform voice and/or data communications;
wherein the mobile device is configured to:
establish a cellular connection with a cellular network;
establish a wireless local area network (WLAN) connection with a WLAN network;
after establishing the cellular connection with the cellular network, dynamically determine a first one or more current network parameters of the cellular network, wherein the first one or more current network parameters affect power consumption of the mobile device;
after establishing the cellular connection with the cellular network, dynamically determine a second one or more current network parameters of the WLAN network, wherein the second one or more current network parameters affect power consumption of the mobile device
determine a condition of the mobile device;
based on the condition of the mobile device, the first one or more current network parameters, and the second one or more current network parameters, dynamically determine whether to use the WLAN connection or the cellular connection for the mobile device based only on power consumption of a battery of the mobile device.

18. The mobile device of claim 17, wherein determining the condition of the mobile device comprises determining a battery level of the mobile device.

19. The mobile device of claim 18, wherein determining whether to use the WLAN connection or the cellular connection for the mobile device based only on power consumption of a battery of the mobile device is performed based on the battery level of the mobile device falling under a threshold.

20. The mobile device of claim 19, wherein the threshold is 10%.

* * * * *